United States Patent
Satoh et al.

(10) Patent No.: US 6,950,468 B2
(45) Date of Patent: Sep. 27, 2005

(54) IMAGE FORMATION CONVERSION APPARATUS AND IMAGE INFORMATION CONVERSION METHOD

(75) Inventors: Kazushi Satoh, Kanagawa (JP); Kuniaki Takahashi, Kanagawa (JP); Teruhiko Suzuki, Chiba (JP); Yoichi Yagasaki, Tokyo (JP)

(73) Assignee: Sony Corporation (JP)

( * ) Notice: Subject to any disclaimer, the term of this patent is extended or adjusted under 35 U.S.C. 154(b) by 561 days.

(21) Appl. No.: 09/986,436

(22) Filed: Nov. 8, 2001

(65) Prior Publication Data

US 2002/0106022 A1 Aug. 8, 2002

(30) Foreign Application Priority Data

Nov. 10, 2000 (JP) ..................................... P2000-344490

(51) Int. Cl.[7] .................................................. H04N 7/12
(52) U.S. Cl. ............. 375/240.13; 375/240; 375/240.01; 375/240.02; 375/240.03; 375/240.12
(58) Field of Search ........................... 375/240, 240.01, 375/240.12, 240.13, 240.02, 240.03; 382/240; 707/10; 709/203

(56) References Cited

U.S. PATENT DOCUMENTS

| | | | | |
|---|---|---|---|---|
| 6,085,223 A | * | 7/2000 | Carino et al. ............... | 709/203 |
| 6,480,539 B1 | * | 11/2002 | Ramaswamy .......... | 375/240.03 |
| 6,647,061 B1 | * | 11/2003 | Panusopone et al. ... | 375/240.12 |
| 6,651,072 B1 | * | 11/2003 | Carino et al. ................. | 707/10 |
| 6,674,911 B1 | * | 1/2004 | Pearlman et al. ........... | 382/240 |

OTHER PUBLICATIONS

Wee, Susie et al. "Field-To-Frame Transcoding with Spatial and Temporal Downsampling" IEEE International Conference on Image Processing, Kobe, Japan Oct. 1999.

* cited by examiner

*Primary Examiner*—Allen Wong
(74) *Attorney, Agent, or Firm*—Rader, Fishman & Grauer PLLC; Ronald P. Kananen

(57) ABSTRACT

The invention provides an image information conversion apparatus and method by which picture quality deterioration caused by setting of an initial value can be prevented when code amount control in MPEG4 image coding is performed based on information extracted from MPEG2 image compression information. An initial reference quantization scale determination section determines an initial value for a reference quantization scale from predetermined MPEG2 image compression information, the number of macro blocks to be included in an MPEG4 bit stream, a code amount allocated to the first I picture of the MPEG2 image compression information stored in an information buffer, an average quantization scale and a target code amount for the first I-VOP of the MPEG4 bit stream calculated by an MPEG4 image information coding section, and then calculates an initial value for a virtual buffer occupation amount based on the determined initial value for the reference quantization scale.

28 Claims, 5 Drawing Sheets

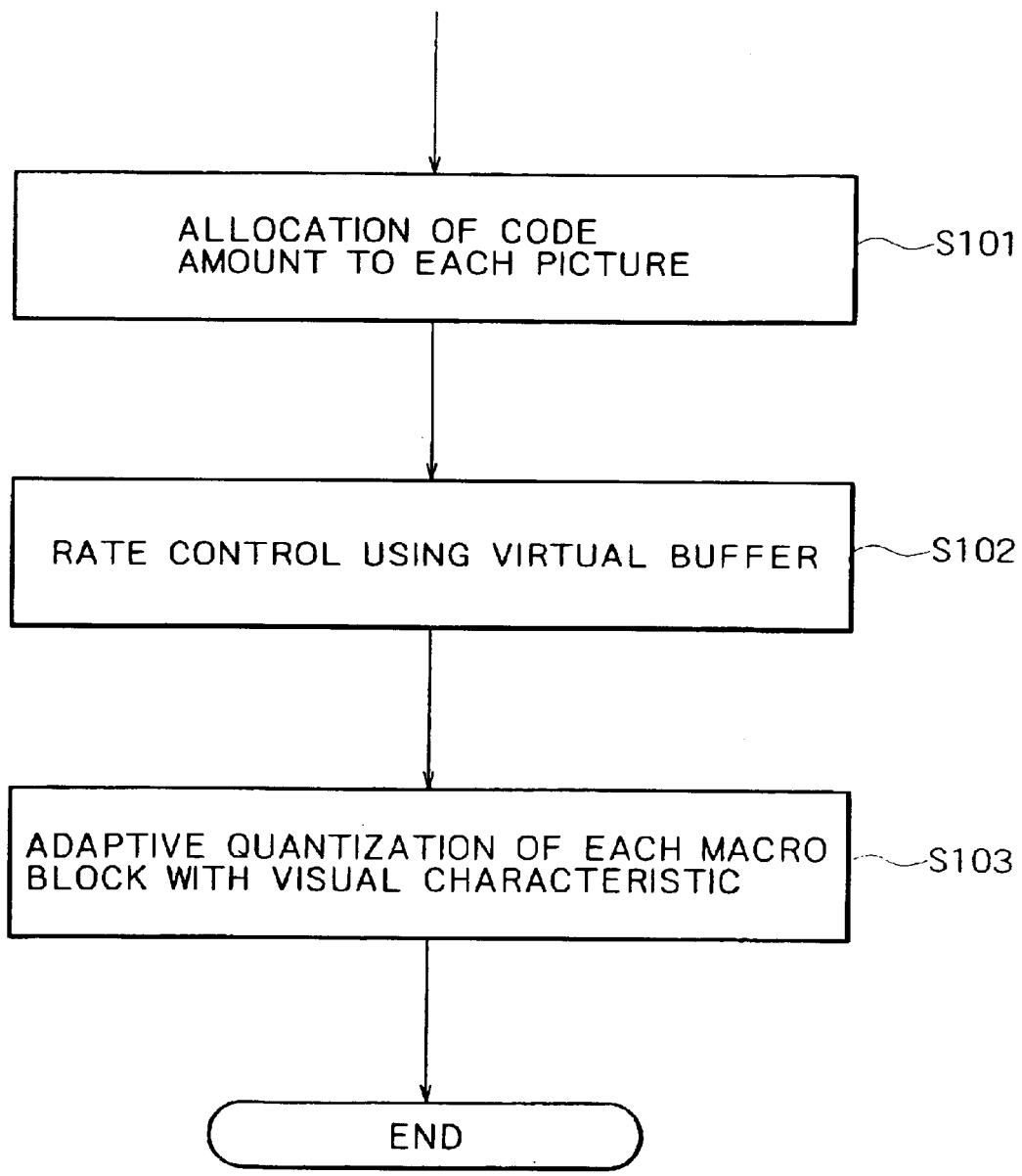

IMAGE FORMATION CONVERSION APPARATUS AND IMAGE INFORMATION CONVERSION METHOD

BACKGROUND OF THE INVENTION

This invention relates to an image information conversion apparatus and an image information conversion method, and more particularly to an image information conversion apparatus and an image information conversion method which are used to receive, through network media such as a satellite broadcast, a cable television broadcast or the Internet or process, on a recording medium such as an optical disk or a magneto-optical disk, image information in the form of a bit stream compressed by orthogonal transform such as discrete cosine transform and motion compensation.

In recent years, an apparatus which complies with a method wherein image information is handled as digital data and the redundancy unique to image information is utilized to compress image information by orthogonal transform such as, for example, discrete cosine transform and motion compensation in order to allow transmission and storage of information with a high efficiency has been and is being popularized in both of information distribution from a broadcasting station or the like and information reception by general homes.

Particularly, MPEG2 standardized by the MPEG (Moving Picture Experts Group) is defined as a general purpose image coding system in the ISO/IEC 13818-2 and covers both of interleaved scan images and progressive scan images as well as standard resolution images and high resolution images. Therefore, it is expected that the MPEG2 be used by wide varieties of applications from professional applications to consumer applications in the future.

Where such an MPEG2 compression system as described above is used, realization of a high compression ratio and a good picture quality can be anticipated by allocating, to interleaved scan images of a standard resolution having, for example, 720×480 pixels, a code amount (hereinafter referred to as bit rate) of 4 to 8 Mbps or by allocating, to interleaved scan images of a high resolution having, for example, 1,920×1,088 pixels, a bit rate of 18 to 22 Mbps.

The MPEG2 is directed to high picture quality coding suitable principally for broadcasting, but is not ready for a coding system of a bit rate lower than, that is, of a compression ratio higher than, that of the MPEG1. However, from popularization of portable terminals, it has been expected that the need for a coding system of a higher compression ratio increase in the future. Therefore, the MPEG4 coding system has been standardized, and the image coding system of the MPEG4 was approved as international standards of the ISO/IEC 14496-2 in December 1998.

In order to process MPEG2 image compression information (hereinafter referred to as MPEG2 bit stream) coded once so as to be suitable for digital broadcasting on a portable terminal or the like, it is demanded to convert the MPEG2 bit stream into MPEG4 image compression information (hereinafter referred to as MPEG4 bit stream) of a lower bit rate.

An image information conversion apparatus (transcoder) which satisfies the demand is disclosed in Susie J. Wee, John G. Apostlopoulos and Nick Feamster, "Field-to-Frame Transcoding with Spatial and Temporal Downsampling", ICIP '99 (hereinafter referred to as document 1). The image information conversion apparatus mentioned is shown in FIG. 4.

Referring to FIG. 4, the image information conversion apparatus 100 shown includes a picture type discrimination section 101, an MPEG2 image information (I/P picture) decoding section 102, a reduction section 103, a video memory 104, an MPEG4 image information (I/P-VOP) coding section 105, a motion vector synthesis section 106, and a motion vector detection section 107. It is to be noted that the VOP (Video Object Plane) in the MPEG4 corresponds to the frame in the MPEG2.

The picture type discrimination section 101 receives data of frames of MPEG2 image compression information (hereinafter referred to as MPEG2 bit stream) of an interleaved scan as an input thereto and discriminates whether data of each frame is of MPEG2 image information (hereinafter referred to as I/P picture which signifies an intra-image coded picture/forward predictive coded picture) or of a B picture (bi-directionally predicted picture) The picture type discrimination section 101 outputs only the former data to the MPEG2 image information decoding section 102 of the following stage.

The MPEG2 image information decoding section 102 executes processing similar to that of an ordinary MPEG2 image information decoding section. However, since data regarding B pictures are discarded by the picture type discrimination section 101, only it is required for the MPEG2 image information decoding section 102 to have a function of decoding only I/P pictures.

The reduction section 103 receives pixel values from the MPEG2 image information decoding section 102 and performs processing of reducing the pixel values to ½ in the horizontal direction and discarding data of one of the first and second fields in the vertical direction while leaving data of the other field to produce a progressive scan image having a size of ¼ that of the inputted image information.

If the MPEG2 bit stream inputted from the MPEG2 image information decoding section 102 represents images compliant with the standards of the NTSC (National Television System Committee), that is, interleaved scan images of 720×480 pixels and 30 Hz, then the images after the reduction by the reduction section 103 have a size of 360×240 pixels. However, in order to allow the processing in a unit of a macro block when the MPEG4 image information coding section 105 in a succeeding stage performs coding, the pixel numbers both in the horizontal and vertical directions must be multiples of 16. Accordingly, the reduction section 103 further performs supplementation or discarding of pixels for satisfying the requirement. In particular, in the specific case described above, eight lines, for example, at the right end or the left end in the horizontal direction are discarded so that the image has a size of 352×240 pixels.

The progressive scan image produced by the reduction section 103 is stored into the video memory 104 and then undergoes coding processing by the MPEG4 image information coding section 105, and is outputted as an MPEG4 bit stream.

Motion vector information in the inputted MPEG2 bit stream is supplied to the motion vector synthesis section 106, by which it is mapped to motion vectors for the image information after the reduction.

The motion vector detection section 107 detects motion vectors of a high degree of accuracy based on the motion vector values synthesized by the motion vector synthesis section 106.

The image information conversion apparatus 100 disclosed in document 1 produces an MPEG4 bit stream of progressive scan images having a size of ½×½ that of an inputted MPEG2 bit stream. For example, where the inputted MPEG2 bit stream complies with the NTSC standards, the MPEG4 bit stream to be outputted has the SIF size (352×240 pixels). The image information conversion apparatus 100 can convert the inputted MPEG2 bit stream also into an image of any other image size, for example, the QSIF (176×112 pixels) size which is a size of approximately ¼×¼ in the example described above, by modifying the operation of the reduction section 103.

Further, the image information conversion apparatus 100 performs, as a process by the MPEG2 image information decoding section 102, a decoding process using all of eighth-order discrete cosine transform coefficients in the inputted MPEG2 bit stream for the horizontal and vertical directions or a decoding process using only low-frequency components from among eighth-order discrete cosine transform coefficients only for the horizontal direction or for both of the horizontal and vertical directions thereby to reduce the arithmetic operation amount for the decoding process and the video memory capacity while suppressing the picture quality deterioration to the minimum.

In the image information conversion apparatus 100 shown in FIG. 4, the code amount control of the MPEG4 image information coding section 105 makes a significant factor of determination of the picture quality of an MPEG4 bit stream In the ISO/IEC 14496-2, the system for code amount control is not specifically prescribed, and each vendor can use a system which is considered optimum from the point of view of the arithmetic operation amount and the output picture quality in accordance with an application to be used. In the following, a system prescribed in the MPEG2 Test Mode 15 (ISO/IEC JTC1/SC29/WG11 N0400) as a representative code amount control system is described.

For the code amount control, bit distribution to each picture is performed as a first step using a target code amount (target bit rate) and a GOP (Group Of Pictures) configuration as input variables, and then rate control is performed using a virtual buffer, whereafter adaptive quantization for each macro block is performed finally taking a visual characteristic into consideration. The operation of the code amount control is illustrated in FIG. 5.

Referring to FIG. 5, first in step S101, the MPEG4 image information coding section 105 distributes an allocation bit amount for each picture in a GOP in accordance with a bit amount (hereinafter represented by R) to be allocated to those pictures which are not decoded as yet including allocation object pictures. This distribution is repeated in order of coded pictures in the GOP. In this instance, the code amount allocation to each picture is performed based on the following two assumptions.

First, it is assumed that the product of an average quantization scale code to be used for coding of each picture and the generated code amount is fixed for each picture type unless the screen does not change. Therefore, after each picture is coded, variables $X_i$, $X_p$ and $X_b$ (global complexity measures) each representative of the complexity of the screen are updated in accordance with the following expressions (1) to (3) for individual picture types:

$$X_i = S_i \cdot Q_i \tag{1}$$

$$X_p = S_p \cdot Q_p \tag{2}$$

$$X_b = S_b \cdot Q_b \tag{3}$$

where $S_i$, $S_p$ and $S_b$ are the generated code bit amounts upon picture coding, and $Q_i$, $Q_p$ and $Q_b$ are average quantization scale codes upon picture coding. The variables $X_i$, $X_p$ and $X_b$ have initial values represented by the following expressions (4) to (6), respectively, using the target code amount (target bit rate) bit_rate [bits/sec]:

$$X_i = 160 \times \text{bit\_rate}/115 \tag{4}$$

$$X_p = 60 \times \text{bit\_rate}/115 \tag{5}$$

$$X_b = 42 \times \text{bit\_rate}/115 \tag{6}$$

Secondly, it is assumed that the picture quality of the entire image is always optimized when the ratios $K_p$ and $K_b$ of the quantization scale code of P and B pictures with reference to the quantization scale code of an I picture have values defined by the following expression (7):

$$K_p = 1.0; K_b = 1.4 \tag{7}$$

In particular, the quantization scale code of a B picture is always 1.4 times that of the quantization scale codes of I and P pictures. Here, it is supposed that, by coding a B picture rather roughly than I and P pictures, if the code amount saved with a B picture is added to that of an I or P picture, then the picture quality of the I or P picture is improved, and also the picture of a B picture which refers to the I or P picture is improved.

From the two assumptions specified as above, the allocation bit amounts ($T_i$, $T_p$, $T_b$) to the different pictures of the GOP have values given by the following expressions (8) to (10), respectively:

$$T_i = \max\left\{\frac{R}{1 + \frac{N_p \cdot X_p}{X_i \cdot K_p} + \frac{N_b \cdot X_b}{X_i \cdot K_b}}, \frac{\text{bit\_rate}}{8 \times \text{picture\_rate}}\right\} \tag{8}$$

$$T_p = \max\left\{\frac{R}{N_p + \frac{N_b \cdot K_p \cdot X_b}{K_b \cdot X_p}}, \frac{\text{bit\_rate}}{8 \times \text{picture\_rate}}\right\} \tag{9}$$

$$T_b = \max\left\{\frac{R}{N_b + \frac{N_p \cdot K_b \cdot X_p}{K_p \cdot X_b}}, \frac{\text{bit\_rate}}{8 \times \text{picture\_rate}}\right\} \tag{10}$$

where $N_p$ and $N_b$ are the numbers of P and B pictures which are not coded in the GOP as yet.

Based on the allocation code amounts determined in this manner, each time a picture is coded in steps S101 and S102, the bit amount R to be allocated to a non-coded picture in the GOP is updated in accordance with the following expression (11):

$$R = R - S_{i,p,b} \tag{11}$$

On the other hand, when the first picture in the GOP is to be coded, the bit amount R is updated in accordance with the following expression (12):

$$R = \frac{\text{bit\_rate} \times N}{\text{picture\_rate}} + R \tag{12}$$

where N is the number of pictures in the GOP. The initial value of the bit amount R at the start of a sequence is 0.

In step S102, in order to make the allocation bit amounts ($T_i$, $T_p$, $T_b$) to the pictures determined in accordance with the expressions (8) to (10) in step S101 and actual generation code amounts coincide with each other, quantization scale codes are determined based on capacities of three different virtual buffers set independently of each other for the individual pictures by feedback control in a unit of a macro block. First, prior to code of a jth macro block, the occupation amounts of the virtual buffers are determined in accordance with the following expressions (13) to (15):

$$d_j^i = d_o^i + B_{j-1} - \frac{T_i \times (j-1)}{MB\_cnt} \quad (13)$$

$$d_j^p = d_o^p + B_{j-1} - \frac{T_p \times (j-1)}{MB\_cnt} \quad (14)$$

$$d_j^b = d_o^b + B_{j-1} - \frac{T_b \times (j-1)}{MB\_cnt} \quad (15)$$

where $d_o^i$, $d_o^p$ and $d_o^b$ are the initial occupation amounts of the virtual buffers, $B_j$ is the generation bit amount from the top of the picture to the jth macro block, and MB_cnt is the number of macro blocks in one picture. The occupation amounts ($d_{MB\_cnt}^i$, $d_{MB\_cnt}^p$, $d_{MB\_cnt}^b$) of the virtual buffers upon ending of coding of the individual pictures are used as initial values ($d_o^i$, $d_o^p$, $d_o^b$) for the virtual buffer occupations for the next pictures.

Then, the quantization scale code for the jth macro block is calculated in accordance with the following expression (16):

$$Q_j = \frac{d_j \times 31}{r} \quad (16)$$

where r is a variable called reaction parameter used to control the response of a feedback loop and given by the following expression (17):

$$r = 2 \times \frac{bit\_rate}{picture\_rate} \quad (17)$$

The initial values of the virtual buffers at the start of coding are given by the following expressions (18) to (20):

$$d_o^i = 10 \times \frac{r}{31} \quad (18)$$

$$d_o^p = K_p \cdot d_o^i \quad (19)$$

$$d_o^b = K_b \cdot d_o^i \quad (20)$$

In step S103, the quantization scale codes determined in step S102 are modified with a variable called activity for each macro block so that they may be quantized finely at a flat portion at which deterioration can be visually observed comparatively conspicuously but may be quantized roughly at a complicated pattern portion at which deterioration can be visually observed comparatively less conspicuously.

The activity is given by the following expression (21) using pixel values of totaling 8 blocks including 4 blocks of a frame discrete cosine transform mode and 4 blocks of a field discrete cosine transform mode using brightness signal pixel values of the original picture:

$$act_j = 1 + \min_{sblk=1,8}(var\_sblk) \quad (21)$$

$$var\_sblk = \frac{1}{64}\sum_{k=1}^{64}(P_k - \bar{P})^2$$

$$\bar{P} = \frac{1}{64}\sum_{k=1}^{64}P_k$$

where $P_k$ is the brightness signal intra-block pixel value of the original image. The reason why a minimum value is taken in the expression (21) is that it is intended to use finer quantization where a flat portion is included only at a portion in the macro block.

Further, a normalized activity $Nact_j$ whose value ranges from 0.5 to 2 is determined in accordance with the following expression (22):

$$Nact_j = \frac{2 \times act_j + avg\_act}{act_j + 2 \times avg\_act} \quad (22)$$

where avg-act is the average value of the activity $act_j$ of the picture coded last.

A quantization scale code $mquant_j$ with a visual characteristic taken into consideration is determined in accordance with the following expression (23) based on the quantization scale code $Q_j$ determined in step S102:

$$mquant_j = Q_j \times N\_act_j \quad (23)$$

By the way, as recited in "Theoretical Analysis of the MPEG Compression Efficiency and Application thereof to the Code Amount Control", Shingaku Giho, IE-95, DSP95-10, May 1995 (hereinafter referred to as document 2), the code amount control system defined in the Test Mode 15 does not always provide a good picture quality in an MPEG2 image coding section.

In document 2, the following system is proposed particularly as a technique for providing an optimum code amount distribution for each of frames in a GOP to provide a good picture quality.

Where $N_I$, $N_P$ and $N_B$ are the numbers of those I, P and B pictures in a GOP which are not coded as yet and the code amounts to be applied to them are represented by $R_I$, $R_P$ and $R_B$, respectively, such a fixed rate condition as given by the following expression (24) is satisfied:

$$R = N_I \cdot R_I + N_P \cdot R_P + N_B \cdot R_B \quad (24)$$

Where the quantization step sizes of individual frames are represented by $Q_I$, $Q_P$ and $Q_B$ and m is an order number for coordinating a quantization step size and a reproduction error variance with each other, that is, if it is assumed that minimization of an average of the quantization step sizes raised to the mth power minimizes the reproduction error variance, then an optimum code amount distribution for each frame in the GOP is given by minimizing the expression (25) given below:

$$\frac{N_I \cdot Q_I^m + N_P \cdot Q_P^m + N_B \cdot Q_B^m}{N_I + N_P + N_B} \quad (25)$$

It is to be noted that the average scale Q and the code amount R of the frames are coordinated with the complexity X of each frame as a medium variable used also in the Test Model 15 as given by the following expression (26):

$$Q \cdot R^a = X \qquad (26)$$

Accordingly, by calculating such code amounts $R_I$, $R_P$ and $R_B$ as minimize the expression (25) using the Lagrange's method of undetermined multipliers taking the expression (26) into consideration under the restrictive condition of the expression (24), such values as given by the following expressions (27) to (29) are determined as optimum code amounts $R_I$, $R_P$ and $R_B$, respectively:

$$R_I = \frac{R}{1 + N_P \cdot \left(\frac{X_P}{X_I}\right)^{\frac{m}{1+m\alpha}} + N_B \cdot \left(\frac{X_B}{X_I}\right)^{\frac{m}{1+m\alpha}}} \qquad (27)$$

$$R_P = \frac{R}{N_P + N_B \cdot \left(\frac{X_B}{X_P}\right)^{\frac{m}{1+m\alpha}}} \qquad (28)$$

$$R_B = \frac{R}{N_B + N_P \cdot \left(\frac{X_P}{X_B}\right)^{\frac{m}{1+m\alpha}}} \qquad (29)$$

Where $\alpha=1$, the expressions (27) to (29) and the expressions (8) to (10) given hereinabove in the code amount control system defined in the MPEG2 Test Mode 15 have the following relationship. In particular, from the expressions (27) to (29), the parameters $K_p$ and $K_b$ for code amount control are adaptively calculated in accordance with the following expression (30) based on the complexities $X_I$, $X_P$ and $X_B$ of each frame:

$$K_P = \left(\frac{X_I}{X_P}\right)^{\frac{1}{1+m}}; K_b = \left(\frac{X_I}{X_B}\right)^{\frac{1}{1+m}} \qquad (30)$$

In document 2, it is disclosed that a good picture quality is obtained by setting the value of 1/(1+m) to approximately 0.6 to 1.2.

However, it is known that the following limitations are applied to the code amount control system defined in the MPEG2 Test Model 15.

The first limitation is that step S101 of FIG. 5 cannot cope with a scene change and therefore the parameter avg_act used in step S103 after the scene change has a wrong value. The second limitation is that it is not guaranteed that the restriction condition of the VBV (Video Buffer Verifier) prescribed in the MPEG2 and the MPEG4 is satisfied.

Accordingly, when the code amount control is performed actually, a countermeasure against the limitations is required.

Further, while the initial value of the reference quantization scale for the first I-VOP in the expression (18) is 10, this initial value is not always an appropriate value depending upon the pattern and the bit rate. Particularly with an image of the SIF or the QSIF, since the number of macro blocks is small, a time corresponding to several VOPs may possibly be required before the feedback loop for code amount control is stabilized. Therefore, picture quality deterioration at an initial stage of the Video object may possibly caused by an initial value of the reference quantization scale.

SUMMARY OF THE INVENTION

It is an object of the present invention to provide an image information conversion apparatus and an image information conversion method by which picture quality deterioration caused by setting of an initial value can be prevented when code amount control in MPEG4 image coding is performed based on information extracted from MPEG2 image compression information.

In order to attain the object described above, according to an aspect of the present invention, there is provided an image information conversion apparatus which receives first image compression information as an input thereto and outputs second image compression information. Each of the first image compression information and the second image compression information includes at least intra-image coded pictures and inter-image prediction coded pictures. The apparatus includes quantization scale determination means for using information extracted from the first image compression information to determine an initial value for a reference quantization scale to be used for production of an intra-image coded picture of the second image compression information and determining an initial value for a virtual buffer occupation amount for an intra-image coded picture based on the initial value for the reference quantization scale to be used for production of the first intra-image coded picture of the second image compression information.

The information extracted from the first image compression information may be an average quantization scale of the first intra-image coded picture of the first image compression information.

In the image information conversion apparatus, an initial value for a reference quantization scale to be used for code amount control in MPEG4 coding is determined based on MPEG2 image compression information of an interlaced scan, and the calculated initial value for the reference quantization scale is used to calculate an initial value for a virtual buffer occupation amount. Consequently, an MPEG4 bit stream of a progressive scan can be outputted while image deterioration caused by setting of an initial value for the reference quantization scale code is prevented.

According to another aspect of the present invention, there is provided an image information conversion method for receiving first image compression information as an input thereto and outputting second image compression information, each of the first image compression information and the second image compression information including at least intra-image coded pictures and inter-image predictive coded pictures, the method comprising the steps of using information extracted from the first image compression information to determine an initial value for a reference quantization scale to be used for production of an intra-image coded picture of the second image compression information, and determining an initial value for a virtual buffer occupation amount for an intra-image coded picture based on the initial value for the reference quantization scale to be used for production of the first intra-image coded picture of the second image compression information.

The information extracted from the first image compression information may be an average quantization scale of the first intra-image coded picture of the first image compression information.

In the image information conversion method, an initial value for a reference quantization scale to be used for code amount control in MPEG4 coding is determined based on MPEG2 image compression information of an interlaced scan, and the calculated initial value for the reference quantization scale is used to calculate an initial value for a virtual buffer occupation amount. Consequently, an MPEG4 bit stream of a progressive scan can be outputted while image deterioration caused by setting of an initial value for the reference quantization scale code is prevented.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 5 is a flow chart illustrating a process of an MPEG4 image information coding section of the image information conversion apparatus of FIG. 4 which performs code amount control using a complexity of each frame extracted by an MPEG2 image information decoding section.

DESCRIPTION OF THE PREFERRED EMBODIMENTS

An image information conversion apparatus according to the present invention calculates an initial value for a reference quantization scale to be used for MPEG4 image coding based on information extracted from inputted MPEG2 image compression information and uses the initial value to calculate an initial value for a virtual buffer occupation amount thereby to prevent picture quality deterioration caused by an inappropriate value of the reference quantization scale.

Figure 1:
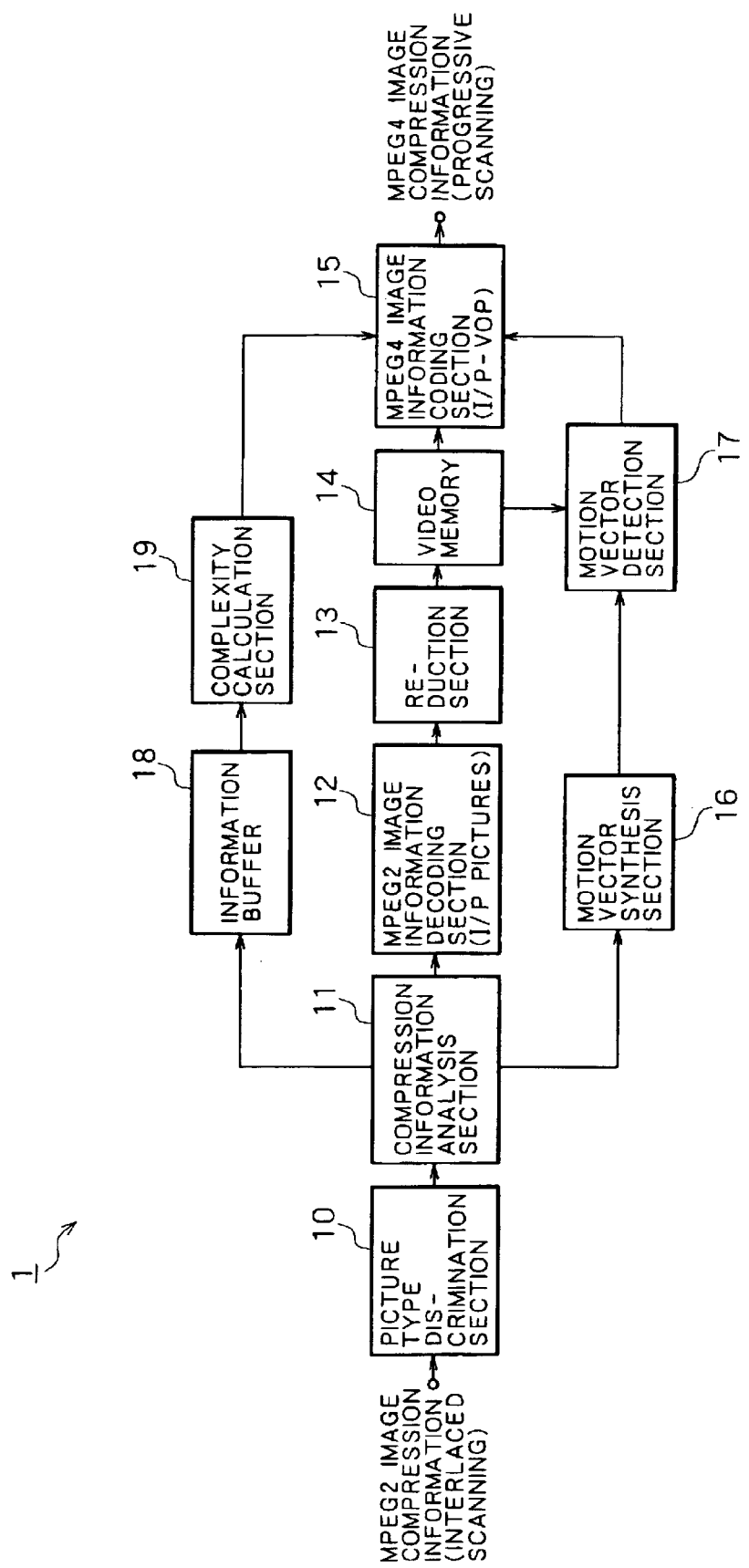
FIG. 1 is a block diagram showing a configuration of an image information conversion apparatus to which the present invention is applied.

Referring to FIG. 1, there is shown an image information conversion apparatus to which the present invention is applied. The image information conversion apparatus 1 shown includes a picture type discrimination section 10, a compression information analysis section 11, a MPEG2 image information decoding section 12, a reduction section 13, a video memory 14, an MPEG4 image information (I/P-VOP) coding section 15, a motion vector synthesis section 16, a motion vector detection section 17, an information buffer 18, and a complexity calculation section 19.

The picture type discrimination section 10 receives data of frames of mpeg2 image compression information of an interlaced scan (hereinafter referred to as mpeg2 bit stream) as an input thereto and discriminates of which one of an intra-image coded picture (hereinafter referred to as i picture), an inter-frame predictive coded picture (hereinafter referred to as p picture) and a bi-directionally predicted coded picture (hereinafter referred to as b picture) is the data of each frame. The picture type discrimination section 10 transmits information regarding i pictures and p pictures (hereinafter referred to as i/p pictures) to the mpeg2 image information decoding section 12 but discards information regarding b pictures.

The compression information analysis section 11 analyzes an a average value Q over an entire frame of the quantization scale used for decoding processing and a total code amount (bit number) B allocated to the frame in the MPEG2 bit stream and sends necessary information to the information buffer 18.

The information buffer 18 stores such generated code amounts (bit numbers) and average quantization scales of I/P pictures of the MPEG2 bit stream.

The complexity calculation section 19 calculates an estimated value of the complexity X for each VOP of MPEG4 image compression information (hereinafter referred to as MPEG4 bit stream) from the information Q and B of each frame stored in the information buffer 18 in accordance with the expression (20) given hereinabove.

The MPEG2 image information decoding section 12 performs decoding processing of information regarding I/P pictures of the MPEG2 bit stream. While the MPEG2 image information decoding section 12 is similar to an ordinary MPEG2 image information decoding section, since data regarding B pictures is discarded by the picture type discrimination section 10, it is required that the MPEG2 image information decoding section 12 can decode at least I/P pictures.

The reduction section 13 receives pixel values as an input thereto from the MPEG2 image information decoding section 12, performs a reduction process to ½ in the horizontal direction for the pixel values and then performs a process of discarding data of only one of the first field and the second field in the vertical direction while leaving data of the other field thereby to produce an image of a progressive scan having a size of ¼ that of the inputted image information.

If the MPEG2 bit stream inputted from the MPEG2 image information decoding section 12 represents images conforming with the standards of the NTSC (National Television System Committee), that is, interleaved scan images of 30 Hz of 720×480 pixels, then the picture size after the reduction processing by the reduction section 13 is 360×240 pixels. However, in order to allow processing to be performed in a unit of a macro block when coding is performed by the MPEG4 image information coding section 15 in a following stage, both of the numbers of pixels of the image in the horizontal and vertical directions must be multiples of 16. Accordingly, the reduction section 13 further performs supplementation or discarding of pixels to satisfy the requirement. In particular, in the case described above, for example, 8 lines at the right end or the left end in the horizontal direction are discarded to produce an image of 352×240 pixels. Here, MPEG4 image information is referred to as I/P-VOP. The VOP (Video Object Plane) corresponds to a frame in the MPEG2 system.

The pictures of a progressive scan produced by the reduction section 13 are stored into the video memory 14 and then undergo coding processing by the MPEG4 image information coding section 15, and consequently are outputted as an MPEG4 bit stream.

Motion vector information in the input MPEG2 bit stream is supplied to the motion vector synthesis section 16 and mapped to motion vectors of the image information after the reduction.

The motion vector detection section 17 detects motion vectors of high accuracy based on the motion vector values synthesized by the motion vector synthesis section 16.

The image information conversion apparatus 1 produces an MPEG4 bit stream of images of a progressive scan having a size of ½×½ of the inputted MPEG2 bit stream. In particular, if the input MPEG2 bit stream complies with the NTSC standards, then the MPEG4 bit stream outputted has the SIF size (352×240). The image information conversion apparatus 1 can change the operation of the reduction section 13 to convert the input MPEG2 bit stream into images of any other image size, for example, in the example described above, into images of the QSIF (176×112 pixels) which is an image size of approximately ¼×¼.

Further, the image information conversion apparatus 1 performs, as processing by the MPEG2 image information decoding section 12 a decoding process using all of eighth-order discrete cosine transform coefficients in the inputted MPEG2 bit stream in both of the horizontal and vertical directions and a decoding process using only low frequency components of eighth-order discrete cosine transform coefficients only in the horizontal direction or in both of the horizontal and vertical directions thereby to reduce the arithmetic operation amount and the video memory capacity involved in the decoding processing while suppressing the picture quality deterioration to the minimum.

The average value Q over the entire frame of the quantization scale used for the decoding processing by the compression information analysis section 11 and the total code amount (bit number) B allocated to the frame in the MPEG2 bit stream are stored into the information buffer 18.

The complexity calculation section 19 calculates the complexity X of each frame stored in the information buffer 18 from the information Q and B for the frame in accordance with the following expression (31):

$$X = Q \cdot B \quad (31)$$

The complexities X of the frames calculated in accordance with the expression (31) above are buffered for one GOV and then sent as a parameter for code amount control to the MPEG4 image information coding section 15. Therefore, a delay for one GOV is required. This delay is implemented using a delay buffer.

In the following, description is given of in what manner the complexity X of each frame in the GOV calculated in accordance with the expression (31) is used by the MPEG4 image information coding section 15. It is to be noted that, in the following description, also a case where the apparatus does not include the picture type discrimination section 10 and does not perform conversion of the frame rate is taken into consideration.

The parameters $K_p$ and $K_b$ determined in accordance with the expression (30) represent that the ratios of ideal average quantization scales $Q_{p\_ideal}$ and $Q_{b\_ideal}$ for a P-VOP/B-VOP to an ideal average quantization scale $Q_{i\_ideal}$ for an I-VOP are given by the following expression (32):

$$\frac{Q_{p\_ideal}}{Q_{i\_ideal}} = K_p;\ \frac{Q_{b\_ideal}}{Q_{i\_ideal}} = K_b \quad (32)$$

In the MPEG2 Test Mode 15, the parameters $K_p$ and $K_b$ are not calculated adaptively as in the expression (30), but such fixed values as given by the expression (7) are used therefor.

From the expressions (30) and (32), where the complexities of an arbitrary VOP 1 and another arbitrary VOP 2 are represented by $X_1$ and $X_2$ and the ideal quantization scales are represented by $Q_{1\_ideal}$ and $Q_{2\_ideal}$, respectively, then the following expression (33) is obtained:

$$\frac{Q_{2\_ideal}}{Q_{1\_ideal}} = \left(\frac{X_1}{X_2}\right)^{\frac{1}{1+m}} \equiv K(X_1, X_2) \quad (33)$$

However, where it is desired to use fixed values as given by the expression (7) as in the MPEG2 Test Mode 15, the following expression (34) should be used in place of the expression (33) above:

$$K(X_1, X_2) \equiv \begin{cases} K_p & (1 = I - VOP, 2 = P - VOP) \\ K_b & (1 = I - VOP, 2 = B - VOP) \\ \dfrac{K_b}{K_p} & (1 = P - VOP, 2 = B - VOP) \\ \dfrac{K_p}{K_b} & (1 = B - VOP, 2 = P - VOP) \\ 1 & \text{(when 1 and 2 are the same type of VOP)} \end{cases} \quad (34)$$

Here, it is assumed that, where the total code amount (bit number) allocated to non-coded VOPs in a GOV is represented by R, when the total code amount R is allocated as $R_1$, $R_2$, . . . , $R_n$ to the VOPs, the picture quality of the GOV is optimized. In this instance, the relational expression given as the following expression (35) is satisfied by the total code amount R and the allocated code amounts $R_1, R_2, \ldots, R_n$:

$$R = R_1 + R_2 + \ldots + R_n \quad (35)$$

Among the average quantization scale $Q_k$, allocated code amount $R_k$ and complexity $X_k$ of an arbitrary $VOP_k$, the relationship represented by the following expression (36) is satisfied:

$$X_k = Q_k \cdot R_k \quad (36)$$

Here, by transforming the expression (35) taking the expression (36) into consideration, the following expression (37) is obtained:

$$R_1 = \frac{R}{\dfrac{R_1 + R_2 + \ldots + R_n}{R_1}} = \frac{R}{1 + \dfrac{R_2}{R_1} + \ldots + \dfrac{R_n}{R_1}} \quad (37)$$

$$= \frac{R}{1 + \dfrac{Q_1}{Q_2} \cdot \dfrac{X_2}{X_1} + \ldots + \dfrac{Q_1}{Q_n} \cdot \dfrac{X_n}{X_1}}$$

$$= \frac{R}{1 + \dfrac{1}{K(X_1, X_2)} \cdot \dfrac{X_2}{X_1} + \ldots + \dfrac{1}{K(X_1, X_n)} \cdot \dfrac{X_n}{X_1}}$$

Although the value obtained by the expression (33) or the value obtained by the expression (34) may be used for $K(X_1, X_2)$ in the expression (37), use of the former can achieve a more optimum code amount distribution suitable for an image.

Thereupon, if the value of $1/(1+m)$ is set to 1.0, then the necessity for exponential operation is eliminated, and consequently, high speed execution can be achieved. Further, even where the value of $1/(1+m)$ is set to a value other than 1.0, high speed execution can be achieved if a table is prepared in advance and referred to to perform exponential operation.

While the complexity $X_k$ of each VOP according to the expression (37) is obtained by MPEG4 image coding, if it is assumed that the complexity of each frame by MPEG2 image coding and the complexity of each frame by MPEG4 image coding are equal to each other, then if the complexity $X_k$ stored in the complexity calculation section 19 is used, then a target code amount for the VOP can be calculated in accordance with the expression (37).

Figure 2:
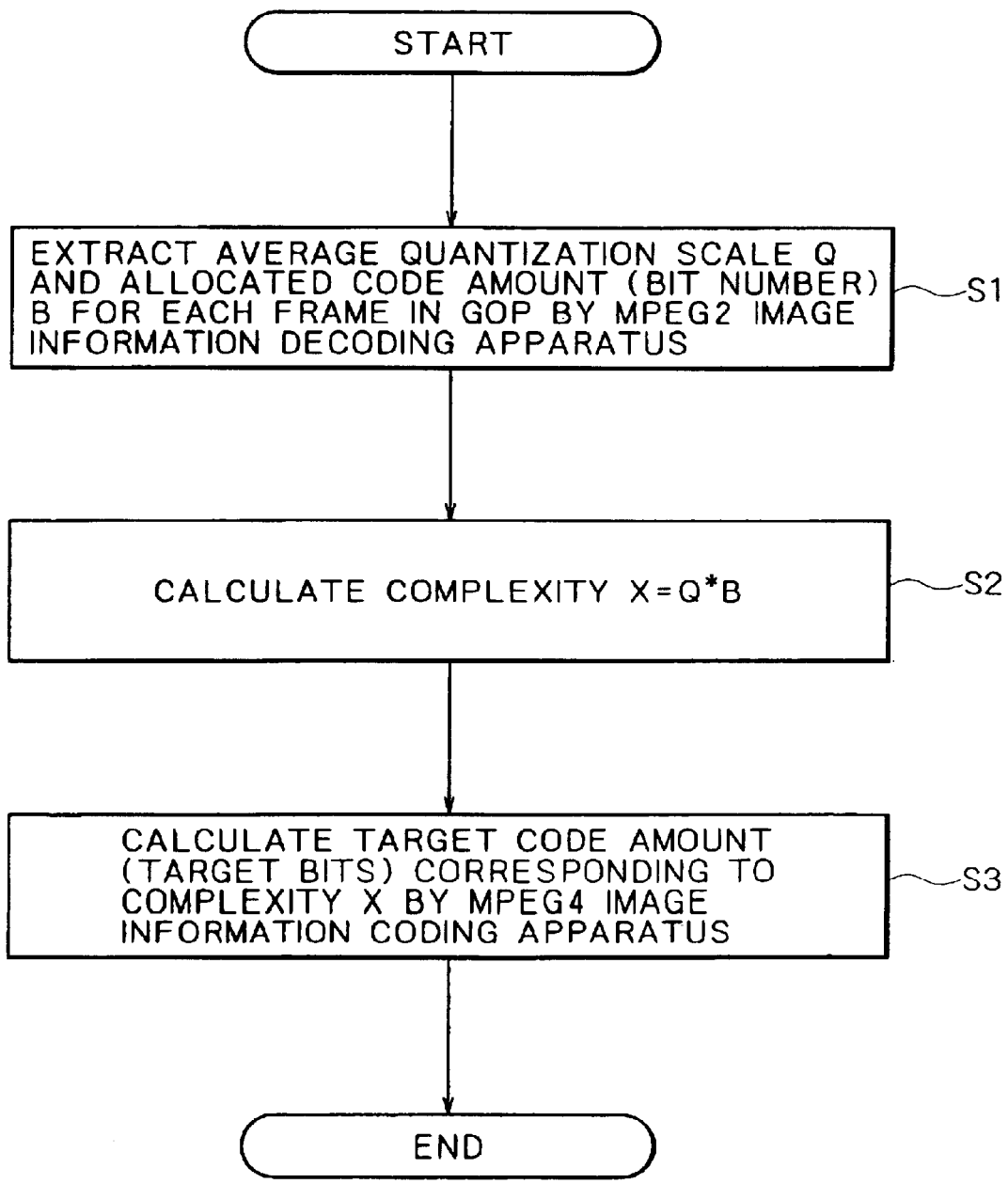
FIG. 2 is a flow chart illustrating operation of the image information conversion apparatus of FIG. 1 when it converts image information.

FIG. 2 illustrates a processing flow when the image information conversion apparatus 1 calculates a target code amount.

Referring to FIG. 2, first in step S1, the MPEG2 image information decoding section 12 extracts the average value Q and the total code amount B (bit amount) of each frame in a GOP.

In step S2, the complexity calculation section 19 calculates the complexity X.

Then in step S3, the MPEG4 image information coding section 15 calculates a target code amount (target bit rate) based on the complexity X.

While the MPEG2 Text Mode 15 assumes that the complexities $X_i$, $X_p$ and $X_b$ of I, P and B pictures in a GOP are fixed, this assumption is not satisfied in such a case that the GOP includes a scene change or the background exhibits a remarkable variation in the GOP, but disturbs stabilized code amount control and makes a cause of picture quality deterioration. With the image information conversion apparatus 1 shown in FIG. 1, since code amount control is based on the complexity of each frame of the inputted MPEG2 bit stream, stabilized code amount control can be anticipated without causing picture quality deterioration.

Now, another image information conversion apparatus to which the present invention is applied is described in detail with reference to FIG. 3.

Figure 3:
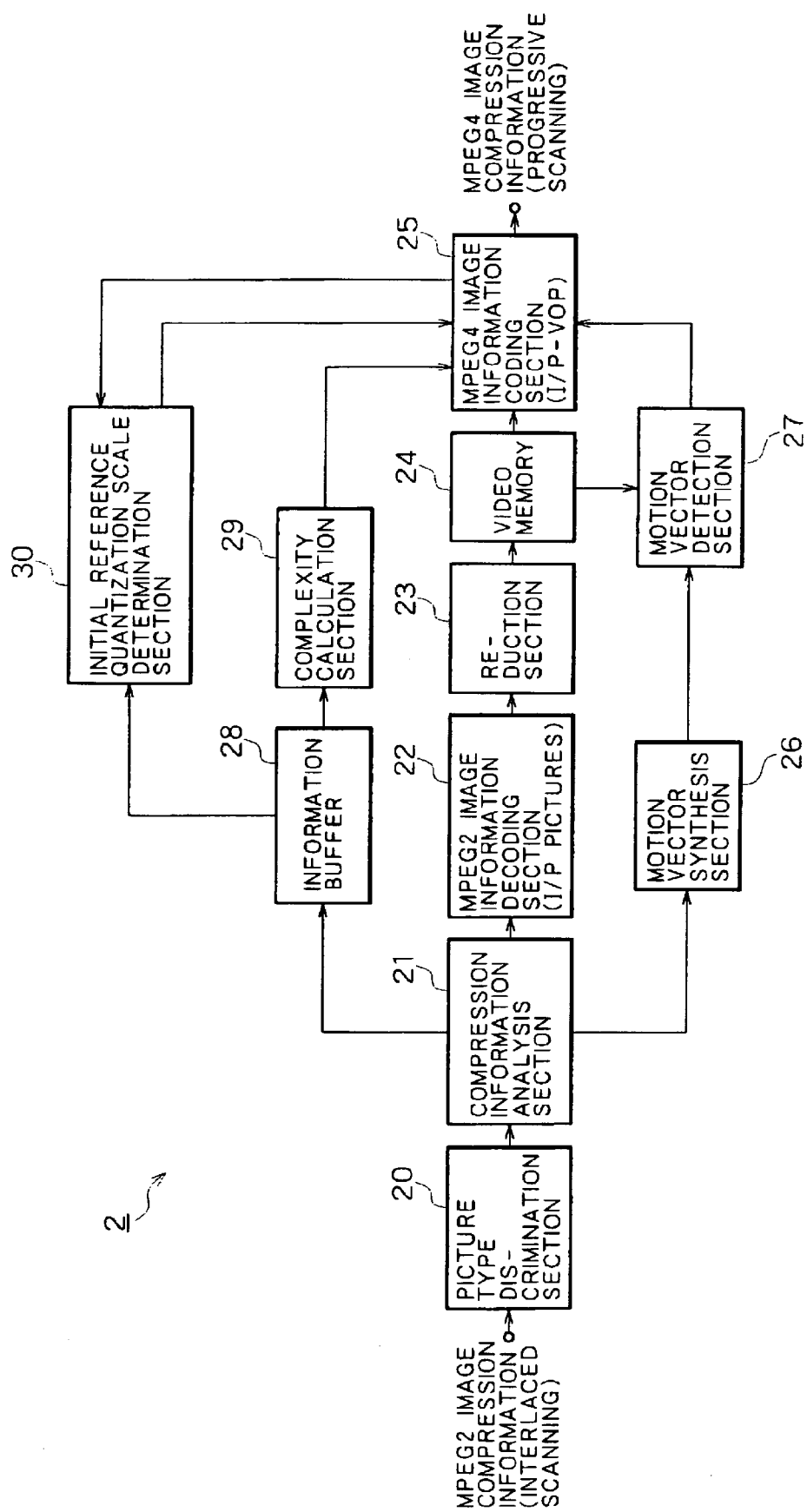
FIG. 3 is a block diagram showing a configuration of another image information conversion apparatus to which the present invention is applied.
Figure 4:
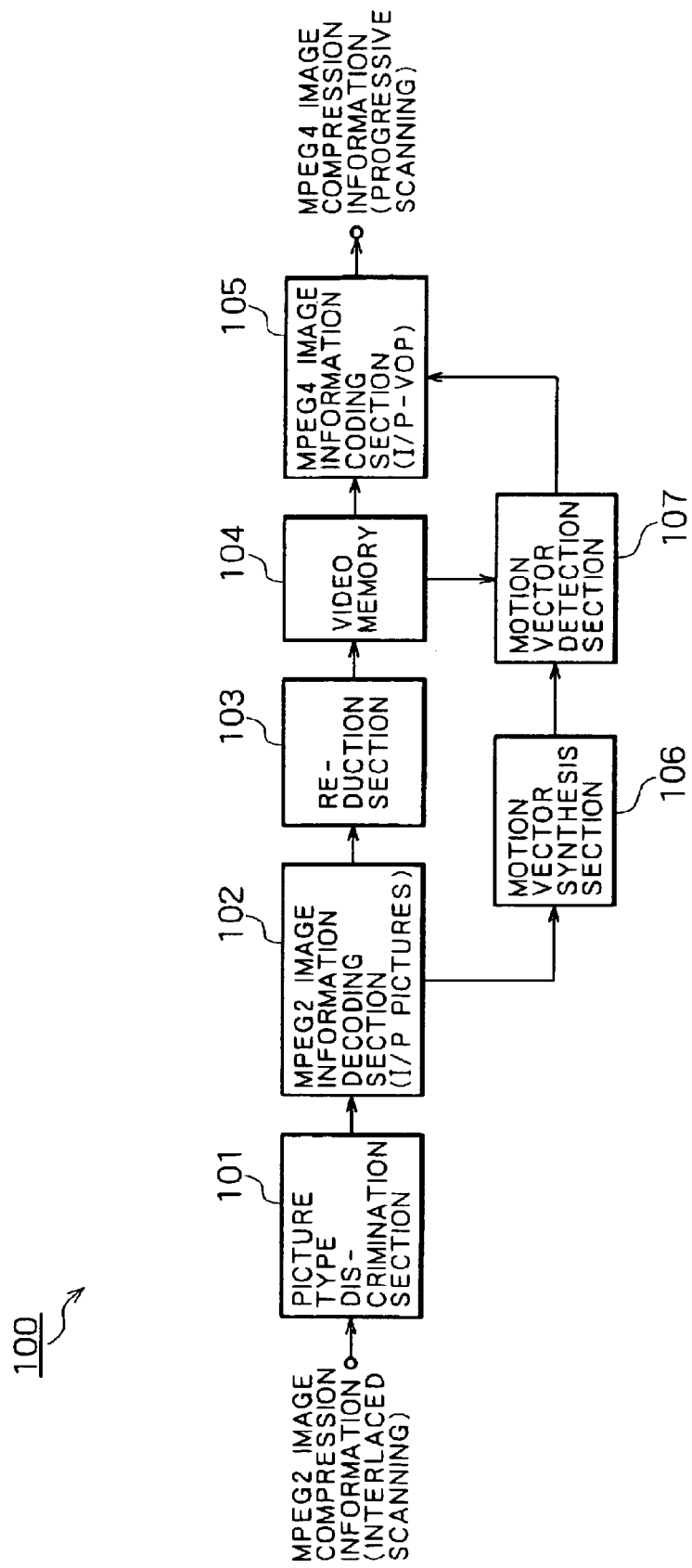
FIG. 4 is a block diagram showing a configuration of a conventional image information conversion apparatus.

The image information conversion apparatus 2 shown in FIG. 3 includes a picture type discrimination section 20, a compression image analysis section 21, an MPEG2 image information decoding section 22, a reduction section 23, a video memory 24, an MPEG4 image information coding section 25, a motion vector synthesis section 26, a motion vector detection section 27 an information buffer 28, a complexity calculation section 29, and an initial reference quantization scale determination section 30.

The picture type discrimination section 20 receives data of frames of MPEG2 image compression information of an interlaced scan (hereinafter referred to as MPEG2 bit stream) and discriminates whether data of each frame relate to MPEG2 image information (hereinafter referred to as I/P picture) or a B picture. The picture type discrimination section 20 sends information regarding an I/P picture to the compression image analysis section 21, but does not send information regarding a B picture.

The compression image analysis section 21 analyzes an average value Q over an entire frame of the quantization scale used for decoding processing and a total code amount (bit number) B allocated to the frame in the MPEG2 bit stream, and sends necessary information to the information buffer 28.

The information buffer 28 stores generated code amounts (bit numbers) and average quantization scales of I/P pictures of the MPEG2 bit stream.

The complexity calculation section 29 calculates an estimated value of the complexity X of each VOP of MPEG4 image compression information (hereinafter referred to as MPEG4 bit stream) from the information Q and B of the frames stored in the information buffer 28.

The MPEG2 image information decoding section 22 performs decoding processing of information regarding I/P pictures of the MPEG2 bit stream. Although the MPEG2 image information decoding section 22 is similar to an ordinary MPEG2 image information decoding section, since data regarding B pictures are discarded by the picture type discrimination section 20, it is required that it can at least decode I/P pictures.

The reduction section 23 receives pixel values from the MPEG2 image information decoding section 22, performs a reduction process to ½ for the pixel values in the horizontal direction, and performs a process of discarding either one of the first field and the second field in the vertical direction while leaving the other field thereby to produce images of a progressive scan having a size equal to ¼ that of the inputted image information.

If the MPEG2 bit stream inputted from the MPEG2 image information decoding section 22 represents, for example, images complying with the NTSC (National Television System Committee) standards, that is, interlaced scan images of 30 Hz and 720×480 pixels, the image size after the reduction processing by the reduction section 23 is 360×240 pixels. However, in order to allow processing to be performed in a unit of a macro block when the MPEG4 image information coding section 15 in a following stage performs coding, the pixel numbers in both of the horizontal and vertical directions must be multiples of 16. Accordingly, in the case described above, eight lines at the right end or the left end in the horizontal direction are discarded so that the image size may be 352×240 pixels. Here, the MPEG4 image information is referred to as I/P-VOP. The VOP (Video Object Plane) corresponds to a frame of the MPEG2.

Images of a progressive scan produced by the reduction section 23 are stored into the video memory 14 and then undergo coding processing by the MPEG4 image information coding section 25, and consequently are outputted as an MPEG4 bit stream.

Motion vector information in the inputted MPEG2 bit stream is supplied to the motion vector synthesis section 26, by which it is mapped to motion vectors of the image information after the reduction.

The motion vector detection section 27 detects motion vectors of a high degree of accuracy based on the motion vector values synthesized by the motion vector synthesis section 26.

The image information conversion apparatus 2 produces an MPEG4 bit stream of progressive scan images having a size of ½×½ of an inputted MPEG2 bit stream. In particular, where the inputted MPEG2 bit stream complies with, for example, the NTSC standards, the MPEG4 bit stream outputted has the SIF size (352×240 pixels). The image information conversion apparatus 2 can perform conversion into images of any other image size, for example, in the example described above, images of the QSIF (176×112 pixels) size which is an image size of approximately ¼×¼ by modifying the operation of the reduction section 13.

Further, the image information conversion apparatus 2 not only performs, as processing by the MPEG2 image information decoding section 22, a decoding process which uses all of eighth-order discrete cosine transform coefficients in the inputted MPEG2 bit stream for both of the horizontal and vertical directions but also performs another decoding process which uses only low-frequency components from among eighth-order discrete cosine transform coefficients only for the horizontal direction or for both of the horizontal and vertical directions thereby to reduce the arithmetic operation amount and the video memory capacity involved in decoding processing while suppressing the picture quality deterioration to the minimum.

The initial reference quantization scale determination section 30 first determines, from the numbers of macro blocks included in an MPEG2 bit stream and an MPEG4 bit stream determined in advance, the code amount (bit number) allocated to the first I picture of the MPEG2 bit stream stored in the information buffer 28, the average quantization scales $Q_{MPEG2,IO}$ and the target code amount (target bit) of the first I-VOP of the MPEG4 bit stream calculated by the MPEG4 image information coding section 25, an initial value for the reference quantization scale, and calculates an initial value for the virtual buffer occupation amount.

The image information conversion apparatus 2 having such a configuration as described above determines the initial value $refQ_{IO}$ of the reference quantization scale of the first I-VOP of the MPEG4 bit stream to be outputted.

According to the first method, where the bit rates and the frame rates of the MPEG2 bit stream inputted to the image information conversion apparatus 2 and the MPEG4 bit stream to be outputted from the image information conversion apparatus 2 are represented by $bit\_rate_{MPEG2}$, $bit\_rate_{MPEG4}$ and $frame\_rate_{MPEG2}$, $frame\_rate_{MPEG4}$, respectively, the initial value $refQ_{IO}$ for the reference quantization scale is represented by the following expression (38):

$$refQ_{IO} = \frac{1}{2} \cdot \frac{bit\_rate_{MPEG2}}{bit\_rate_{MPEG4}} \cdot \frac{frame\_rate_{MPEG4}}{frame\_rate_{MPEG2}} \cdot Q_{MPEG2,IO} \quad (38)$$

The reason why ½ is used as a coefficient in the expression (38) above is that the quantization scale code 62 of the MPEG2 corresponds to the MPEG4 quantization scale code 31.

According to the second method, where the code amount (bit number) allocated to the first I picture of the inputted MPEG2 bit stream is represented by $B_{MPEG2,IO}$, the target code amount (target bit) of the first I-VOP of the first MPEG4 bit stream to be outputted, which is calculated in accordance with the expressions (8) to (10) or the expression (37), is represented by $T_{IO}$, and the quantities of macro blocks included in one frame of the inputted MPEG2 bit stream and macro blocks included in one VOP of the MPEG4 bit stream to be outputted are represented by $MB\_cnt_{MPG2}$ and $MB\_cnt_{MPEG4}$, respectively, the initial value $refQ_{IO}$ is represented in accordance with the following expression (39):

$$refQ_{IO} = \frac{1}{2} \cdot \frac{B_{MPEG2,IO}}{T_{IO}} \cdot \frac{MB\_cnt_{MPEG4}}{MB\_cnt_{MPEG2}} \cdot Q_{MPEG2,IO} \quad (39)$$

In the expressions (38) and (39) given above, the quantization scale in MPEG4 coding cannot assume any other value than integers from 1 to 31. Therefore, one of the integers from 1 to 31 which is nearest to the initial value $refQ_{IO}$ calculated in accordance with the expression (38) or (39) is used as the initial value $refQ_{IO}$ which is used in the later processing.

The initial vale $d_o^i$ for the virtual occupation amount of an I-VOP is determined using the following expression (40):

$$d_o^i = \frac{refQ_{IO} \times 31}{r} \quad (40)$$

In the following, also a case wherein the picture type discrimination section 20 is used to discard B pictures but conversion of the frame rate is not performed is taken into consideration. At this time, the initial values $d_o^p$ and $d_o^b$ of the virtual buffer occupation amounts for P/B-VOPs may be calculated using any of the following methods.

According to the first method, where the ratios $K_p$ and $K_b$ are constants given by the expression (7) above, the initial values $d_o^p$ and $d_o^b$ are calculated in accordance with the expression (41) given below using the initial value $d_o^i$ determined using the expression (40):

$$d_o^p = K_p \cdot d_o^i; d_o^b = K_b \cdot d_o^i \quad (41)$$

According to the second method, similarly to the expression (38), the initial values $refQ_{PO}$ and $refQB_{BO}$ are calculated in accordance with the following expressions (42) and (43); respectively:

$$refQ_{PO} = \frac{1}{2} \cdot \frac{bit\_rate_{MPEG2}}{bit\_rate_{MPEG4}} \cdot \frac{frame\_rate_{MPEG4}}{frame\_rate_{MPEG2}} \cdot Q_{MPEG2,PO} \quad (42)$$

$$refQ_{BO} = \frac{1}{2} \cdot \frac{bit\_rate_{MPEG2}}{bit\_rate_{MPEG4}} \cdot \frac{frame\_rate_{MPEG4}}{frame\_rate_{MPEG2}} \cdot Q_{MPEG2,BO} \quad (43)$$

Alternatively, similarly to the expression (39), the initial values $refQ_{PO}$ and $refQ_{BO}$ are calculated in accordance with the following expressions (44) and (45); respectively:

$$refQ_{PO} = \frac{1}{2} \cdot \frac{B_{MPEG2,PO}}{T_{PO}} \cdot \frac{MB\_cnt_{MPEG4}}{MB\_cnt_{MPEG2}} \cdot Q_{MPEG2,PO} \quad (44)$$

$$refQ_{BO} = \frac{1}{2} \cdot \frac{B_{MPEG2,BO}}{T_{BO}} \cdot \frac{MB\_cnt_{MPEG4}}{MB\_cnt_{MPEG2}} \cdot Q_{MPEG2,BO} \quad (45)$$

Using the initial values $refQ_{PO}$ and $refQ_{BO}$, the initial values $d_o^p$ and $d_o^b$ for the virtual buffer occupation amounts are calculated in accordance with the following expressions (46) and (47), respectively:

$$d_o^p = \frac{refQ_{PO} \times 31}{r} \quad (46)$$

$$d_o^b = \frac{refQ_{BO} \times 31}{r} \quad (47)$$

As described in detail above, the image information conversion apparatus 2 can prevent picture quality deterioration arising from the fact that the reference quantization scale has an inappropriate value because the initial reference quantization scale determination section 30 calculates an initial value for a reference quantization when MPEG4 image coding is performed based on information extracted from an inputted MPEG2 bit stream and then calculates an initial value for a virtual buffer occupation amount.

It is to be noted that, when an initial value for a reference quantization scale is to be determined, the initial reference quantization scale determination section 30 may determine it from the average quantization scale code for the first I picture of the MPEG2 bit stream stored in the information buffer and the frame rates and the bit rates of the MPEG2 bit stream and the MPEG4 bit stream.

Further, while, in the foregoing description, an MPEG2 bit stream is inputted and an MPEG4 bit stream is outputted, the input and the output are not limited to them, and the image compression information may be image compression information of, for example, the MPEG1 or the H.263.

While preferred embodiments of the present invention have been described using specific terms, such description is for illustrative purposes only, and it is to be understood that changes and variations may be made without departing from the spirit or scope of the following claims.

What is claimed is:

1. An image information conversion apparatus which receives first image compression information as an input thereto and outputs second image compression information, each of the first image compression information and the second image compression information including at least intra-image coded pictures and inter-image prediction coded pictures, comprising:

quantization scale determination means for using information extracted from the first image compression information to determine an initial value for a reference quantization scale to be used for production of an intra-image coded picture of the second image compression information and determining an initial value for a virtual buffer occupation amount for an intra-image coded picture based on the initial value for the reference quantization scale to be used for production of the first intra-image coded picture of the second image compression information; and wherein the first image compression information is an average quantization scale of the first intra-image coded picture of the first image compression information and a ratio of a code amount of the first image compression information to a code amount of the second image compression information.

2. An image information conversion apparatus according to claim 1, wherein the initial value for the reference quantization scale to be used for production of the first intra-image coded picture of the second image compression information is determined by operation of the product of, a ratio of a frame rate of the second image compression information.

3. An image information conversion apparatus according to claim 2, wherein an integer nearest to the value obtained by the arithmetic operation from among integers representative of the quantization scale used for coding of the second image compression information is used as the initial value for the reference quantization scale to be used for production of the first intra-image coded picture of the second image compression information.

4. An image information conversion apparatus according to claim 2, wherein the initial value for the virtual buffer occupation amount for the intra-image coded picture is determined based on a ratio of the product of the initial value for the reference quantization scale and the highest value of integers representative of the quantization scale used for coding of the second image compression information to a variable based on a ratio between a bit rate and a display rate.

5. An image information conversion apparatus according to claim 4, wherein the inter-image prediction coded pictures include a forward prediction coded picture and a bi-directionally predicted coded picture, and the initial value for the virtual buffer occupation amount for the forward prediction coded picture is determined by operation of the product of the initial value for the virtual buffer occupation amount for the intra-image coded picture and a first constant whereas the initial value for the virtual buffer occupation amount for the bi-directionally predicted coded picture is determined by operation of the product of the initial value for the virtual buffer occupation amount for the forward prediction coded picture and a second constant.

6. An image information conversion apparatus according to claim 2, wherein the inter-image predictive coded pictures include a forward predictive coded picture and a bi-directionally predicted coded picture, and the initial value for the reference quantization scale to be used for production of the first forward predictive coded picture of the second image compression information is determined by operation of the product of a ratio of the code amount of the first image compression information to the code amount of the second image compression information, a ratio of the frame rate of the second image compression information to the frame rate of the first image compression information, and an average quantization scale of the first inter-image predictive coded picture of the second image compression information, whereafter the initial value for the reference quantization scale to be used for production of the first bi-directionally predicted coded picture of the second image compression information is determined by operation of the product of a ratio of the code amount of the first image compression information to the code amount of the second image compression information, a ratio of the frame rate of the second image compression information to the frame rate of the first image compression information, and an average quantization scale of the first bi-directionally predicted coded picture of the second image compression information.

7. An image information conversion apparatus according to claim 6, wherein the inter-image predictive coded pictures include a forward predictive coded picture and a bi-directionally predicted coded picture, and the initial value for the virtual buffer occupation amount for the forward predictive coded picture is determined based on a ratio of the product of the initial value for the reference quantization scale to be used for production of the first inter-image predictive coded picture of the second image compression information and the highest value of integers representative of the quantization scale used for coding of the second image compression information to a variable based on a ratio between a bit rate and a display rate, whereafter the initial value for the virtual buffer occupation amount for the bi-directionally predicted coded picture is determined based on a ratio of the product of the initial value for the reference quantization scale to be used for production of the first bi-directionally predicted coded picture of the second image compression information and the highest value of integers representative of the quantization scale used for coding of the second image compression information to the variable based on the ratio between the bit rate and the display rate.

8. An image information conversion apparatus according to claim 2, wherein the inter-image predictive coded pictures include a forward predictive coded picture and a bi-directionally predicted coded picture, and the initial value for the reference quantization scale to be used for production of the first forward predictive coded picture of the second image compression information is determined by operation of the product of a ratio of the code amount allocated to the first inter-image predictive coded picture of the first image compression information to a target code amount for the first inter-image predictive coded picture of the second image compression information, a ratio of the number of predetermined coding units included in one frame of the second image compression information to the number of predetermined coding units included in one frame of the first image compression information, and an average quantization scale of the forward predictive coded picture of the first image compression information, whereafter the initial value for the reference quantization scale to be used for production of the first bi-directionally predicted coded picture of the second image compression information is determined by operation of the product of a ratio of the code amount allocated to the first bi-directionally predicted coded picture of the first image compression information to a target code amount for the first bi-directionally predicted coded picture of the second image compression information, a ratio of the number of predetermined coding units included in one frame of the second image compression information to the number of predetermined coding units included in one frame of the first image compression information, and an average quantization scale of the bi-directionally predicted coded picture.

9. An image information conversion apparatus according to claim 8, wherein the inter-image predictive coded pictures include a forward predictive coded picture and a bi-directionally predicted coded picture, and the initial value for the virtual buffer occupation amount for the forward predictive coded picture is determined based on a ratio of the product of the initial value for the reference quantization scale to be used for production of the first inter-image predictive coded picture of the second image compression information and the highest value of integers representative of the quantization scale used for coding of the second image compression information to a variable based on a ratio between a bit rate and a display rate, whereafter the initial value for the virtual buffer occupation amount for a bi-directionally predicted coded picture is determined based on a ratio of the product of the initial value for the reference quantization scale to be used for production of the first bi-directionally predicted coded picture of the second image compression information and the highest value of integers representative of the quantization scale used for coding of the second image compression information to the variable based on the ratio between the bit rate and the display rate.

10. An image information conversion apparatus according to claim 1, wherein the initial value for the reference quantization scale for the first intra-image coded picture of the second image compression information is determined by operation of the product of a ratio of the code amount allocated to the first intra-image coded picture of the first image compression information to a target code amount for the first intra-image coded picture of the second image compression information, a ratio of the number of predetermined coding units included in one frame of the second image compression information to the number of predetermined coding units included in one frame of the first image compression information, and an average quantization scale of the first intra-image coded pictures of the first image compression information.

11. An image information conversion apparatus according to claim 10, wherein an integer nearest to the value obtained by the arithmetic operation from among integers representative of the quantization scale used for coding of the second image compression information is used as the initial value for the reference quantization scale to be used for production of the first intra-image coded picture of the second image compression information.

12. An image information conversion apparatus according to claim 10, wherein the initial value for the virtual buffer occupation amount for the intra-image coded picture is determined based on a ratio of the product of the initial value for the reference quantization scale and the highest value of integers representative of the quantization scale used for coding of the second image compression information to a variable based on a ratio between a bit rate and a display rate.

13. An image information conversion apparatus according to claim 12, wherein the inter-image predictive coded pictures include a forward predictive coded picture and a bi-directionally predicted coded picture, and the initial value for the virtual buffer occupation amount for the forward predictive coded picture is determined by operation of the product of the initial value for the virtual buffer occupation amount for the intra-image coded picture and a first constant whereas the initial value for the virtual buffer occupation amount for the bi-directionally predicted coded picture is determined by operation of the product of the initial value for the virtual buffer occupation amount for the forward predictive coded picture and a second constant.

14. An image information conversion apparatus according to claim 1, wherein the first image compression information is MPEG2 image compression information standardized by the Moving Picture Experts Group, and the second image compression information is MPEG4 image compression information.

15. An image information conversion method for receiving first image compression information as an input thereto and outputting second image compression information, each of the first image compression information and the second image compression information including at least intra-image coded pictures and inter-image predictive coded pictures, said method comprising the steps of:
   using information extracted from the first image compression information to determine an initial value for a reference quantization scale to be used for production of an intra-image coded picture of the second image compression information; and
   determining an initial value for a virtual buffer occupation amount for an intra-image coded picture based on the initial value for the reference quantization scale to be used for production of the first intra-image coded picture of the second image compression information,
   wherein the first image compression information is an average quantizaton scale of the first intra-image coded picture of the first image compression information and a ration of a code amount of the first image compression information to a code amount of the second image compression information.

16. An image information conversion method according to claim 15, wherein the initial value for the reference quantization scale to be used for production of the first intra-image coded picture of the second image compression information is determined by operation of the product of a ratio of a frame rate of the second image compression information.

17. An image information conversion method according to claim 16, wherein an integer nearest to the value obtained by the arithmetic operation from among integers representative of the quantization scale used for coding of the second image compression information is used as the initial value for the reference quantization scale to be used for production of the first intra-image coded picture of the second image compression information.

18. An image information conversion method according to claim 16, wherein the initial value for the virtual buffer occupation amount for an intra-image coded picture is determined based on a ratio of the product of the initial value for the reference quantization scale and the highest value of integers representative of the quantization scale used for coding of the second image compression information to a variable based on a ratio between a bit rate and a display rate.

19. An image information conversion method according to claim 18, wherein the inter-image predictive coded pictures include a forward predictive coded picture and a bi-directionally predicted coded picture, and the initial value for the virtual buffer occupation amount for the forward predictive coded picture is determined by operation of the product of the initial value for the virtual buffer occupation amount for an intra-image coded picture and a first constant whereas the initial value for the virtual buffer occupation amount for a bi-directionally predicted coded picture is determined by operation of the product of the initial value for the virtual buffer occupation amount for the forward predictive coded picture and a second constant.

20. An image information conversion method according to claim 16, wherein the inter-image predictive coded pictures include a forward predictive coded picture and a bi-directionally predicted coded picture, and the initial value for the reference quantization scale to be used for production of the first forward predictive coded picture of the second image compression information is determined by operation of the product of a ratio of the code amount of the first image compression information to the code amount of the second image compression information, a ratio of the frame rate of the second image compression information to the frame rate of the first image compression information, and an average quantization scale of the first inter-image predictive coded picture of the second image compression information, whereafter the initial value for the reference quantization scale to be used for production of the first bi-directionally predicted coded picture of the second image compression information is determined by operation of the product of a ratio of the code amount of the first image compression information to the code amount of the second image compression information, a ratio of the frame rate of the second image compression information to the frame rate of the first image compression information, and an average quantization scale of the first bi-directionally predicted coded picture of the second image compression information.

21. An image information conversion method according to claim 20, wherein the inter-image predictive coded pictures include a forward predictive coded picture and a bi-directionally predicted coded picture, and the initial value for the virtual buffer occupation amount for the forward predictive coded picture is determined based on a ratio of the product of the initial value for the reference quantization scale to be used for production of the first inter-image predictive coded picture of the second image compression information and the highest value of integers representative of the quantization scale used for coding of the second image compression information to a variable based on a ratio between a bit rate and a display rate, whereafter the initial value for the virtual buffer occupation amount for a bi-directionally predicted coded picture is determined based on a ratio of the product of the initial value for the reference quantization scale to be used for production of the first bi-directionally predicted coded picture of the second image compression information and the highest value of integers representative of the quantization scale used for coding of the second image compression information to the variable based on the ratio between the bit rate and the display rate.

22. An image information conversion method according to claim 16, wherein the inter-image predictive coded pictures include a forward predictive coded picture and a bi-directionally predicted coded picture, and the initial value for the reference quantization scale to be used for production of the first forward predictive coded picture of the second image compression information is determined by operation of the product of a ratio of the code amount allocated to the first inter-image predictive coded picture of the first image compression information to a target code amount for the first inter-image predictive coded picture of the second image compression information, a ratio of the number of predetermined coding units included in one frame of the second image compression information to the number of predetermined coding units included in one frame of the first image compression information, and an average quantization scale of the forward predictive coded picture, whereafter the initial value for the reference quantization scale to be used for production of the first bi-directionally predicted coded picture of the second image compression information is determined by operation of the product of a ratio of the code amount allocated to the first bi-directionally predicted coded picture of the first image compression information to a target code amount for the first bi-directionally predicted coded picture of the second image compression information, a ratio of the number of predetermined coding units included in one frame of the second image compression information to the number of predetermined coding units included in one frame of the first image compression information, and an average quantization scale of the bi-directionally predicted coded picture.

23. An image information conversion method according to claim 22, wherein the inter-image predictive coded pictures include a forward predictive coded picture and a bi-directionally predicted coded picture, and the initial value for the virtual buffer occupation amount for the forward predictive coded picture is determined based on a ratio of the product of the initial value for the reference quantization scale to be used for production of the first inter-image predictive coded picture of the second image compression information and the highest value of integers representative of the quantization scale used for coding of the second image compression information to a variable based on a ratio between a bit rate and a display rate, whereafter the initial value for the virtual buffer occupation amount for the bi-directionally predicted coded picture is determined based on a ratio of the product of the initial value for the reference quantization scale to be used for production of the first bi-directionally predicted coded picture of the second image compression information and the highest value of integers representative of the quantization scale used for coding of the second image compression information to the variable based on the ratio between the bit rate and the display rate.

24. An image information conversion method according to claim 15, wherein the initial value for the reference quantization scale for the first intra-image coded picture of the second image compression information is determined by operation of the product of a ratio of the code amount allocated to the first intra-image coded picture of the first image compression information to a target code amount for the first intra-image coded picture of the second image compression information, a ratio of the number of predetermined coding units included in one frame of the second image compression information to the number of predetermined coding units included in one frame of the first image compression information, and an average quantization scale of the first intra-image coded pictures of the first image compression information.

25. An image information conversion method according to claim 24, wherein an integer nearest to the value obtained by the arithmetic operation from among integers representative of the quantization scale used for coding of the second image compression information is used as the initial value for the reference quantization scale to be used for production of the first intra-image coded picture of the second image compression information.

26. An image information conversion method according to claim 24, wherein the initial value for the virtual buffer occupation amount for an intra-image coded picture is determined based on a ratio of the product of the initial value for the reference quantization scale and the highest value of integers representative of the quantization scale used for coding of the second image compression information to a variable based on a ratio between a bit rate and a display rate.

27. An image information conversion method according to claim 26, wherein the inter-image predictive coded pictures include a forward predictive coded picture and a bi-directionally predicted coded picture, and the initial value for the virtual buffer occupation amount for the forward predictive coded picture is determined by operation of the product of the initial value for the virtual buffer occupation amount for an intra-image coded picture and a first constant whereas the initial value for the virtual buffer occupation amount for the bi-directionally predicted coded picture is determined by operation of the product of the initial value for the virtual buffer occupation amount for the forward predictive coded picture and a second constant.

28. An image information conversion method according to claim 15, wherein the first image compression information is MPEG2 image compression information standardized by the Moving Picture Experts Group, and the second image compression information is MPEG4 image compression information.

* * * * *

UNITED STATES PATENT AND TRADEMARK OFFICE
CERTIFICATE OF CORRECTION

PATENT NO. : 6,950,468 B2
DATED : September 27, 2005
INVENTOR(S) : Kazushi Satoh et al.

It is certified that error appears in the above-identified patent and that said Letters Patent is hereby corrected as shown below:

<u>Title page, Item [54] and Column 1, line 1,</u>
Title, should read as follows:
-- IMAGE INFORMATION CONVERSION APPARATUS AND IMAGE INFORMATION CONVERSION METHOD --.

Signed and Sealed this

Eighteenth Day of April, 2006

JON W. DUDAS
*Director of the United States Patent and Trademark Office*